UNITED STATES PATENT OFFICE.

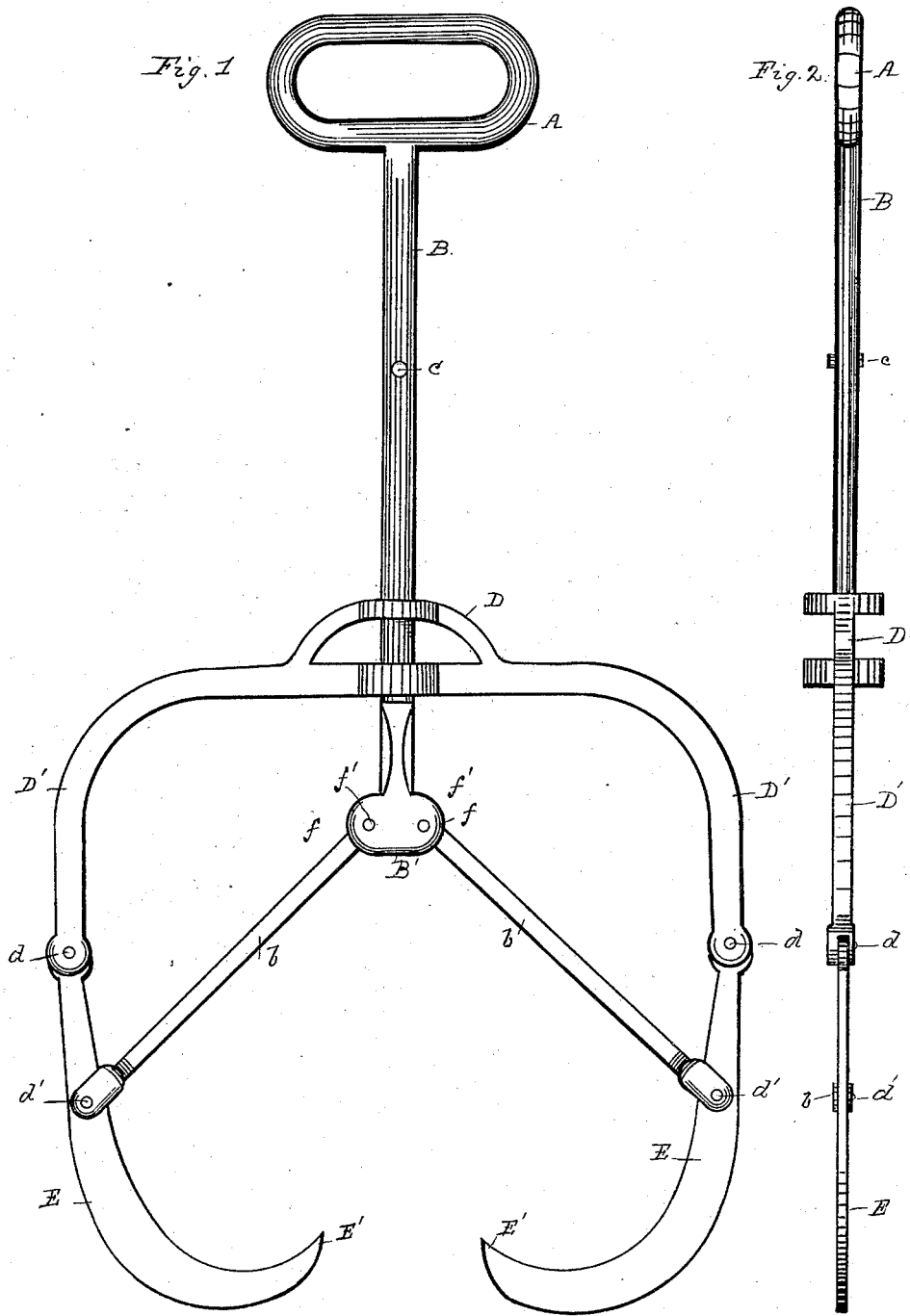

JOHN WINEBRENER, OF CROMWELL, INDIANA.

ICE-HOOK.

SPECIFICATION forming part of Letters Patent No. 277,437, dated May 8, 1883.

Application filed April 3, 1883. (Model.)

*To all whom it may concern:*

Be it known that I, JOHN WINEBRENER, a citizen of the United States, residing at Cromwell, in the county of Noble and State of Indiana, have invented certain new and useful Improvements in Ice-Hooks, of which the following is a specification, reference being had therein to the accompanying drawings.

My invention relates to improvements in ice-hooks, and has for its object to grapple pieces of ice, stone, or other material for carrying or hoisting purposes. I attain this object by the mechanism illustrated in the accompanying drawings, forming a part of this specification, in which—

Figure 1 is a front elevation; Fig. 2, a side elevation.

The letter A represents the handle, of metal, from which extends in a downward direction a shank, B, which passes through openings in bow-shaped pieces of metal, D D', and is enlarged at its lower end into ears $f'$, to which are secured the arms $b$ by rivets $f'$. These arms $b$ extend outwardly in opposite directions as far as the grappling-irons E, to which they are attached by the rivets $d'$.

C is a stop in the shank B, which regulates the extent of the opening of the grappling-irons E.

To use the ice-hook it is taken in the hand by handle A, and the hooks or grappling-irons E are opened sufficiently to grasp the object which it is desired to carry. Then, lifting by the handle A, the hooks are drawn toward each other by the arms $b$ as the shank B ascends through the openings in the bow-shape pieces D D'.

Should a rope be attached to the handle A and the other end be passed over a pulley, the hooks may be used for hoisting hay, stone, or other articles. The hooks E may have double points E' without departing from my invention.

Having described my invention, what I desire to secure by Letters Patent and to claim is—

In an ice-hook, the combination of handle A, shank B, bows D D', and ears $f$ with the arms $b$ and grappling-hooks E, substantially as described, and for the purposes set forth.

In testimony whereof I affix my signature in presence of two witnesses.

JOHN WINEBRENER.

Witnesses:
THOMAS TAYLOR,
GEO. W. BARNHART.